June 6, 1961  H. G. ABBEY  2,987,201
ELECTRIC HYDRAULIC CONTROL SYSTEM FOR LEAP FROG CONVEYORS
Filed July 9, 1957  2 Sheets-Sheet 1
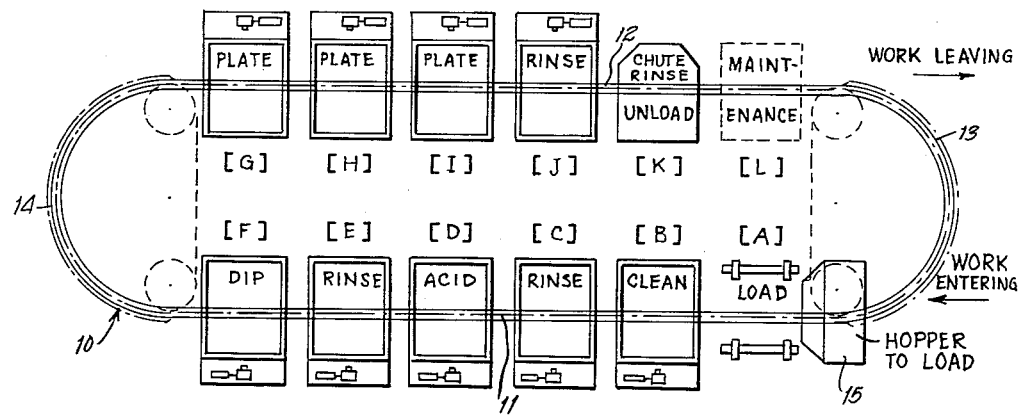
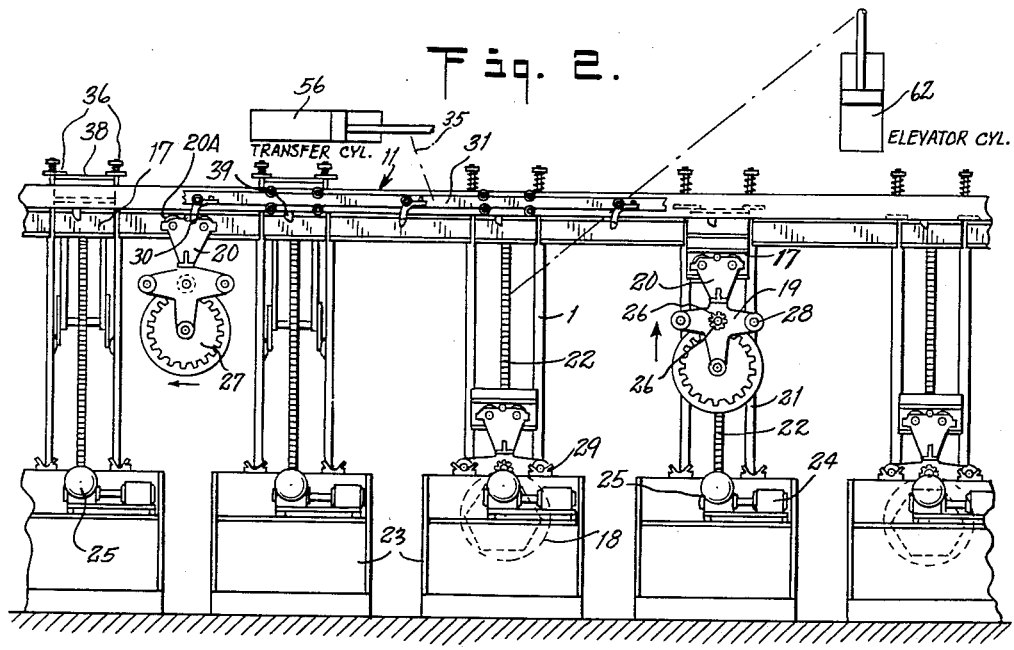
INVENTOR.
HAROLD G. ABBEY
BY
ATTORNEYS June 6, 1961 H. G. ABBEY 2,987,201
ELECTRIC HYDRAULIC CONTROL SYSTEM FOR LEAP FROG CONVEYORS
Filed July 9, 1957 2 Sheets-Sheet 2
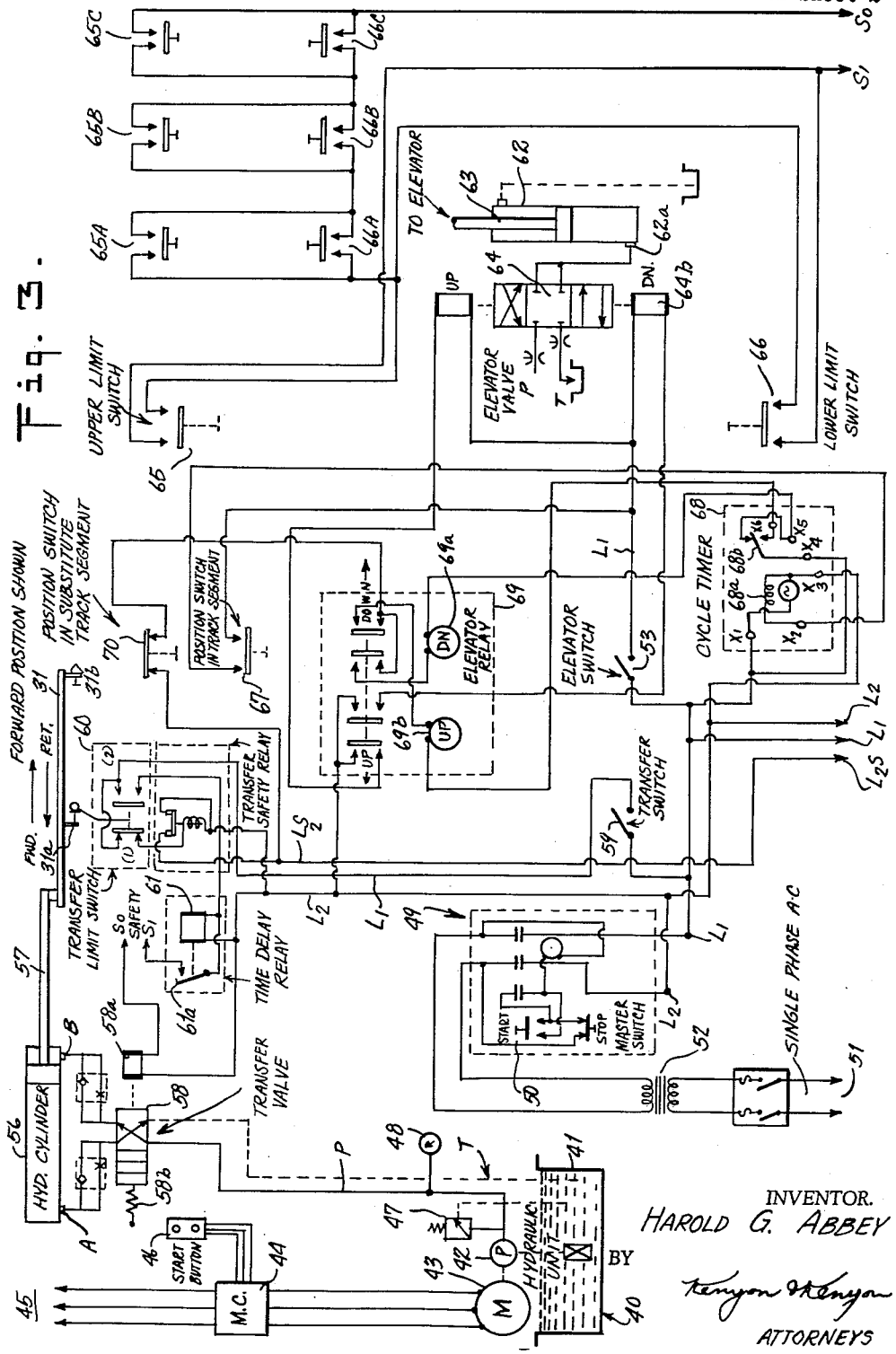
INVENTOR.
HAROLD G. ABBEY
BY
Kenyon & Kenyon
ATTORNEYS

United States Patent Office 2,987,201
Patented June 6, 1961

2,987,201
ELECTRIC HYDRAULIC CONTROL SYSTEM FOR LEAP FROG CONVEYORS
Harold G. Abbey, 189—10 Aberdeen Road, Jamaica 23, N.Y.
Filed July 9, 1957, Ser. No. 670,780
8 Claims. (Cl. 214—89)

The present invention relates generally to control systems for conveyors of the type including an overhead track from which several work carriers are suspended for conveyance to a series of work stations below the track, and more particularly to a self-sequencing electric hydraulic control system for such conveyor whereby a given work carrier may be lowered or otherwise removed from the track without blocking the continued travel of other carriers along said track.

In my copending application entitled "Skip Transfer Conveyers," filed August 1, 1956, Serial No. 601,461, issued on September 30, 1958 as Patent 2,854,159, there is disclosed a conveyor structure including a plurality of work carriers conveyable on an overhead track for travel to various work stations therebelow, the track including removable rail segments vertically aligned with said stations. Individual elevators are provided for the removable segments to lower same to a work station, the work carrier being supported on the rail segment. For each removable segment there is also provided a substitute segment which automatically replaces the removable segment when it is lowered and serves to re-establish the continuity of the track and thereby permit uninterrupted passage of the carriers. The removable and substitute segments are in vertically superposed relation, whereby the lowering action of the former to a point below the track concurrently lowers the substitute segment into its track position. Thus, no gaps are permitted to remain in the track and the flow of traffic thereon is maintained. This makes possible a leap frog operation in which as one work carrier occupies a down or work position, the next carrier by-passes the occupied station to continue its travel on the conveyor to an assigned station.

It is the main object of this invention to provide an electric hydraulic system for a conveyor as above described, wherein the elevators for the removable segment may be individually controlled and wherein a work carrier may be lowered to a work station and thereafter returned to the main track in a timed sequence or cycle. As applied to the electroplating process, the invention makes it possible progressively to position work carriers over different treatments or electroplating baths and to immerse the work in a predetermined sequence.

It is also an object of the invention to provide a hydraulic mechanism wherein a transfer bar is hydraulically actuated to transfer all carriers that are in an up position to the next station.

Yet another object of the invention is to provide a safety circuit for a system of the above-mentioned type in which transfer is prevented when any elevator is between its up and down position. The safety circuit also operates to prevent elevators from rising or falling from their previous position until a forward transfer is completed.

A further object of the invention is to provide a hydraulically controlled conveyor system adapted to carry out a series of plating operations automatically in a predetermined order.

Still another object is to provide a conveyor control system of efficient and reliable design which may be manufactured at relatively low cost.

The invention provides a flexibility of operation not heretofore attainable in any of the conveyors or machines now in existence. For example, existing machines can effect immersions in a fixed cycle but cannot vary immersion time for any one bath without proportionately varying all immersion times. Conventional machines process each work carrier in a fixed sequence or progression. None can process any work on a carrier out of sequence, i.e., 2 must follow 1, 3 must follow 2, etc.

Heretofore machines were compelled to follow a fixed pattern of control sequences for they were bound mechanically either to a common elevating superstructure that lifts all the carriers to be transferred or by a series of cams fixed to a drive shaft that elevates them in a fixed order, or they were fastened to chains that move them laterally in a fixed order either in the up or down position.

Finally, all present machines have work carriers either fixed to the mechanism or chain, or are positioned by a fixed mechanism thus constraining the carriers to a closed loop prescribed by the machine. Introducing or removing work carriers to the processing loop, known to the trade as "loading or unloading," is accomplished by independent machines which physically engage, lift, remove and place on another conveyor loop the processed work or conversely "load" the machine from a feeding loop.

The significant advantage of the instant invention is that it makes it possible to process a work carrier out of sequence to vary treatment time in any part of a cycle without affecting the treatment time of other baths or immersions. Any work carrier can select its own desired treatment cycle in the instant system and can "leap-frog" as necessary for "cell" type treatment or plating in any sequence. The invention also allows for integrating the processing cycle with any system of power and free conveying to provide carrier accumulation, periodic feeding or loading, and after processing, conveying to any location for unloading, reloading and return to processing only constrained by the limitations of monorail systems.

This may be accomplished because each carrier is completely independent of one another, consisting of wheeled carriers on a monorail which can be transferred or conveyed by any power means, i.e., reciprocating latches or pusher dogs on a moving chain. Each carrier can be lowered for immersion or processing by individually powered and controlled elevators. The lowering of carriers for immersion or processing does not interupt or stop the conveying of other carriers because this system provides a substitute track segment which automatically fills the gap left by the lowered elevator. Thus the invention makes possible self-sequencing by carrier selection, a system of control in which the carrier itself carries its own signalling means for its processing and cycling.

For a better understanding of the invention, as well as other objects and further features thereof, reference is had to the following detailed description of the invention to be read in connection with the accompanying drawing wherein like components in the several views are identified by like reference numerals.

In the drawing:

FIG. 1 is a schematic plan view of an automatic plating machine incorporating a conveyor including an electric hydraulic system in accordance with the invention;

FIG. 2 is an elevational view of the machine shown in FIG. 1;

FIG. 3 is a schematic circuit diagram of the electric hydraulic system in accordance with the invention.

*The conveyor structure*

Referring now to FIGS. 1 and 2, there is shown the general arrangement and operation of a continuous line plating machine embodying a conveyor 10, the conveyor being constituted by two parallel straight line track sections 11 and 12 whose ends are effectively linked by arcuate track sections 13 and 14. At spaced locations below track section 11 are six work stations A to F, while below the opposing track section 12 are work stations G to H. The invention, while illustrated with a track loop, is also applicable to straight line operation. It is also to be understood that the invention is not limited to plating operations and may be utilized to carry out any series of work functions.

Work pieces entering the machine are supplied to a loading chute or hopper 15 whose contents are then dumped into the work cylinders or barrels at the loading station A. From station A, the carriers are transferred to work station B where the articles are chemically cleaned or electro-cleaned as desired. Cold water rinsing is carried out at station C. For this purpose a plain steel tank with a dam overflow may be used.

At station D, the articles are subjected to pickling in a suitable acid bath, the tank therefore being lined with an acid-resistant material. After pickling, the articles are cold water rinsed at work station E and here too the tanks must be lined with acid-resistant material, such as lead. Cyanide or acid dip is effected at station F.

Stations G, H and I are reserved for plating operation, and for this purpose separate or a single multi-segmented tank may be used. Obviously, any desired number of stations may be employed for this purpose. At station J the plated work is cold water rinsed from which point it is transferred to station K where it is hot water rinsed in a chute and unloaded. Station L may be used for maintenance operation on the conveyor or it may be constituted by a dryer for the plated articles.

Thus, in travelling from station A to L, a complete plating cycle is effected. By means of the conveyor, the various processing steps are carried out automatically and with maximum dispatch. The plating operations, per se, are conventional and form no part of the invention. They do serve, however, to illustrate the functioning of the conveyor, and the manner in which skip transfer or leap frogging is executed within the context of a plating machine.

As shown in FIG. 2, the overhead track 11 is constituted by a fixedly supported I beam 16 acting as a monorail and including transfer rail segments 17 which normally are in linear registration with the trackway but are removable therefrom. The rail segments 17, as shown in FIG. 2, are in vertical alignment with the work stations therebelow. The rail may be in various forms, depending on the type of carrier employed. Thus the rail may be constituted of hollow tubing, an inverted T section, a round bar or a rectangular bar. A double rail track may also be used in lieu of a monorail structure.

Travelling along the monorail are work carriers, preferably in the form of perforated cylindrical plating barrels 18 of non-conductive material, such as hard rubber, Lucite or melamine. The barrels are rotatably supported between the dependent arms of a yoke member 19. The conveyor may be used in conjunction with all types of cellular liquid treatment. For non-electrolytic treatments (phosphating) metal cylinders may be used in place of the non-metallic barrels.

Yoke 19 is suspended below a trolley 20 having two sets of wheels 20A which ride on either side of the lower flange of the rail 17 to transport the barrel to selected stations. While a wheeled trolley is shown herein, this is only necessary for heavy duty operations. For example, slide type trolleys may be used on light duty work.

Each transfer rail segment 17 is movable downwardly by means of an individual elevator having vertical frame beams 21 and a continuous chain 22 to which the transfer segment is mechanically coupled, so that when the chain is driven by the hydraulic mechanism shown in FIG. 3, the segment may be lowered or raised thereby depending on the direction of drive. When the rail segment is lowered with a work carrier thereon, the plating barrel 18 is immersed in a processing tank 23 at the work station. Mounted adjacent the end wall of the tank is a drive motor 24 for rotating the barrel through a speed reducer 25 whose output gear intermeshes with a drive gear 26 projecting from one end of the yoke 19 and operatively coupled to the barrel gear 27. Also projecting from opposing ears on the yoke are two electrodes or horns 28 which when the barrel is lowered into the tank are seated in and electrically engage with contact saddles 29 to supply plating current in the usual manner.

The trolleys 20 of the several work carriers are indexed or shifted in a stepwise manner along the monorail in one direction by means of spaced pusher fingers 30 which are pivotally connected to a reciprocally operated actuator bar 31 disposed above the rail and parallel thereto. The bar 31 is slidably supported between rollers 32 or 33 and is driven by a hydraulic piston 56 to which it is coupled by means of suitable straps 35. The bar is driven in alternate directions and at timed intervals.

Resiliently supported above each transfer rail segment by means of helical springs 36 is a substitute rail segment 38 which is an exact duplicate of segment 17. The arrangement is such that when the transfer segment 17 is lowered the substitute segment 38 is urged by the springs downwardly in place of the transfer segment so that no break exists in the continuity of the trackway and successive work carriers are able to proceed without interruption and skip over any work carrier which has been lowered into a work station. Thus the withdrawal of one or more work carriers from the trackway does not act to delay the transfer of other carriers. While the transfer segments are shown herein as spring mounted, it is to be understood that any of the other arrangements disclosed in the copending application may be used for the mounting of the substitute segment and for insertion thereof upon removal of the main track segment.

For each forward stroke of the transfer bar, the pusher finger 30 advances a trolley 20 from one work station to the next. The trolley is halted by a pivotally mounted latching stop 39 when it occupies a center position on the rail segment 17 above the appropriate work station. Stop 39 is acted upon by a latching mechanism such that it locates and centers the carrier during the transfer interval but it is withdrawn during the indexing operation to permit the advance of the carrier on the rail.

*The hydraulic pump unit and the machine control*

Referring now to FIG. 3, there is shown an electric hydraulic system in accordance with the invention, fluid pressure for the conveyor being supplied by a hydraulic pump unit, generally designated by numeral 40 and including a fluid reservoir 41, and a pump 42 driven by a three-phase electric motor 43 of standard design. Motor 43 is connected through a magnetic controller 44 to a three-phase power source 45. The pump unit is started by pressing a starter button 46 in the controller circuit, the unit supplying fluid to a fluid line P which in practice is maintained at a pressure of approximately 1000 lbs./sq. inch. Fluid return to the reservoir is through a drain pipe T. Fluid pressure is controlled by a master pressure valve 47 and is indicated by a pressure meter 48.

The master switch for the machine control is designated by numeral 49. Pressing of starter button 50 feeds power from a single phase alternating-current line 51 through transformer 52 to power lines $L_1$, $L_2$ and $L_2S$. Separate station control switches 53, etc., interposed in line $L_1$ control power to the various elevator stations, only one elevator station being shown in the drawing.

*Operation and control cycle*

As pointed out previously, the movement of the work carriers is effected by a reciprocating transfer bar 31. The bar is actuated by a hydraulic cylinder 56 which operates a piston 57 linked to the transfer bar. The movement of the piston in cylinder 56 is controlled by a solenoid-actuated transfer valve 58 which supplies fluid thereto through either inlet port A or port B. When the solenoid 58a is energized, the valve acts to supply fluid from the pressure line P into port A, forcing the piston to make a forward stroke and thereby actuate the transfer bar 31, port B acting as a relief to pass fluid into drain pipe T.

Thus the actuation of the transfer bar 31 at all machine stations and the resultant operation of the push toggles and latching mechanisms effects a transfer of those carriers that are in the up position to the next station. De-energization of the solenoid 58a causes spring 58b to retract valve 58 and thereby feed pressurized fluid from pipe P to the port B, relief now being through port A to drain T. This results in retraction of piston 57 to the return or start position.

Power for valve solenoid 58a is controlled through a transfer switch 59 in power line $L_1$ and with switch 59 open or upon a power failure, valve 58 is caused to assume its spring return position. The valve solenoid is energized through a safety interlock circuit $S_0$ and $S_1$. It will be assumed in this section of the description that the safety circuit is closed.

A transfer limit switch 60 is provided having two sets of contacts (1) and (2). Switch 60 is operatively coupled to transfer bar 31 by actuating arms 31a and 31b, such that when the transfer bar reaches the limit of its forward stroke, contacts (2) are tripped open, thereby closing contacts (1). When, on the return stroke, the end thereof is reached, contacts (1) are tripped open and contacts (2) are caused to close. No changes in contact positions occur between the limits of the transfer bar movement.

The valve solenoid 58a may be energized only when the following conditions exist simultaneously:

(1) Transfer switch 59 is closed.
(2) Contacts (2) on limit switch 60 are closed.
(3) Contacts 61a on a time delay relay 61 are closed.
(4) Safety circuit $S_0$—$S_1$ is closed.

It will be noted that the valve solenoid 58a is connected to power lines $L_1$ and $L_2$ through the safety circuit serially with contacts 61a on the time delay relay with contacts (2) on the limit switch 60 and finally with switch 59, current flowing through the solenoid only when the above listed elements are closed. The solenoid of the time delay relay 61 is connected to power lines $L_1$ and $L_2$ through the (2) contacts of the transfer limit switch 60 and the switch 59.

Assuming, therefore, that transfer bar 31 is at its initial position (i.e., end of return stroke and beginning of forward stroke) whereby contacts (2) of limit switch 60 are closed, when transfer switch 59 is closed, time delay relay 61 will be energized and upon completion of its preset dwell time, contacts 61a will be closed, thereby feeding current to valve solenoid 58a.

This operates transfer valve 58 to supply fluid to the cylinder 56 through the A port and to effect relief through the B port, so that the transfer piston 57 moves forward to actuate the transfer bar mechanism of all stations, the pull toggles and latching devices of which act to transfer those carriers that are in the Up position on the elevator to the next station. At the end of the forward stroke, the transfer bar 31 trips open contacts (2) of switch 60, thereby breaking the valve solenoid 58a circuit and also the circuit to the time delay relay 61 which thereupon resets. De-energization of the valve solenoid reverses the feeder into the hydraulic cylinder to cause retraction of the piston.

To review briefly the sequence of operations of the transfer control, it will be noted that when the transfer control switch 59 is closed, time delay relay 61 is energized and when the relay completes its preset dwell time it closes its contacts 61a to complete the circuit between lines $L_1$ and $L_2$ to solenoid 58a through the contacts (2) of switch 60 which are initially closed. The energization of solenoid 58a causes valve 58 to operate the hydraulic cylinder piston in the forward direction to effect a transfer operation of the work carriers, and at the end of the forward stroke, the contacts (2) of switch 60 are opened by the transfer bar 31, thereby de-energizing solenoid 58a and also relay 61 which resets. Thus with solenoid 58a de-energized, valve 58 causes retraction of the piston to complete the operating cycle.

The elevator controls

We shall now consider the structure and operation of the elevator controls for elevator 1, all the other elevator controls being identical therewith. Thus the circuit shown is typical for a process station. When station switch 53 for the elevator is closed, this energizes the control for that station only. Should it be desired to inactivate a station for any reason whatever, the opening of station switch 53 will arrest the elevator in the up or down position, depending on which direction the elevator may be travelling when the current was cut off. De-energization of the controls will lock the hydraulic system at any point at which de-energization occurs.

The elevator at the station is operated by a hydraulic cylinder 62 in which a piston 63 is reciprocable, the piston being mechanically coupled by gear or other means to the elevator such that when fully extended the elevator is raised to its upper limit and when fully retracted the elevator is lowered to its bottom limit. Cylinder 62 has a single inlet 62a through which pressurized fluid is supplied through a solenoid-activated elevator control valve 64 provided with an Up solenoid 64a and a Down solenoid 64b. When the Up solenoid 64a is energized, valve 64 acts to supply pressure fluid from pipe P to the inlet 62a of the elevator cylinder to push the piston 63 up and thereby raise the elevator. And when the Down solenoid 64b is energized, fluid from cylinder 62 is permitted to drain through inlet 62a into the pipe T returning to the fluid reservoir. In this condition piston 63 is brought to its down position by gravity, the piston being subjected to the weight of the elevator frame and mechanism, the work carrier and the work load.

An upper limit switch 65 having a pair of contacts is mechanically actuated by the elevator structure whereby only when the elevator is in its extreme Up position, are the contacts caused to close. The reverse condition prevails when the elevator is in any other position. A lower limit switch 66 is provided also containing a pair of contacts, this switch being caused to close only when the elevator arrives at its extreme Down position.

The contacts of the Up switch 65 are connected in series with corresponding contacts on the Up switches 65A, 65B, 65C, etc., in the other elevators making up the conveyor system, the series chain of contacts being connected to the safety lines $S_1$ and $S_0$, which lines, as pointed out previously, are interposed in the circuit of solenoid 58a in the transfer control mechanism. The contacts of the Up switches 65, etc., are safety contacts and are closed only when all of the elevators occupy their extreme Up position. Hence transfer is prevented when any of the elevators is below its extreme Up limit unless the associated safety switch is shunted out. Such shunting out is effected, as will now be explained, only when the elevator reaches its extreme Down position.

The contacts of the Down switch 66 are connected in parallel relation with the contacts in the Up switch 65 and the contacts of the respective Down switches 66A, 66B, 66C, etc., in the other elevators constituting the conveyor system are connected in parallel with their corresponding Up contacts 65A, 65B and 65C. Consequently, either the extreme Up or Down position of the elevator produces a closed circuit and any intermediate position breaks the contact chain in the safety circuit.

It will be seen therefore that the transfer mechanism can be operated only in the following circumstances: (a) when all of the elevators occupy their extreme Up position, (b) when all of the elevators occupy their extreme Down position, or (c) when all of the elevators occupy either an extreme Up or Down position. Hence, if any one elevator in the conveyor structure is between limits, the energization of the transfer mechanism is prevented.

The reason for the above-described safety arrangement is that at the extreme Up position the trackway segments are aligned for smooth transfer of a carrier out of a given station and of another into the station. On the other hand, in the extreme Down position, adequate clearance is available for overhead transfer along the substitute track segment by a by-passing or leap-frogging carrier. For all other conditions transfer is not desirable and is precluded by the system which breaks the overall safety circuit $S_0$—$S_1$ and disables transfer valve 58 until proper safety conditions are fulfilled.

Assuming that the elevator is in its extreme Up position when the elevator switch 53 is closed, the following action will occur: The Up switch 65 will be closed by the elevator to close safety circuit $S_0$—$S_1$, allowing energization of the transfer solenoid 58a. The transfer mechanism can now operate to position a work carrier laterally into the elevator track segment (FIG. 2—element 17). The movement of the carrier into the track segment closes a position switch 67. The contacts of position switch 67 are connected between power line $L_1$ and terminal $X_2$ of a cycle timer 68, terminal $X_1$ thereof being connected to power line $L_1$. Thus, when the contacts of position switch 67 are closed, current is fed to the motor 68a of the timer and at the same time a relay switch 68b is actuated to effect a closed circuit between terminals $X_4$ and $X_5$.

A closed circuit between terminals $X_4$ and $X_5$ permits energization of the down solenoid 69a of an elevator relay 69 which acts to position this relay to effect energization of the down solenoid 64b of the elevator hydraulic valve 64. This positions the valve 64 so that the cylinder 62 is open to the hydraulic reservoir and the piston 63 lowers to its down position by reason of gravity (i.e., weight of elevator frame, work carrier, etc.).

At the Down position the elevator trips the lower limit switch 66 to close the safety contacts $S_1$ and $S_2$, thus permitting further transfer operations. The cycle timer 68 is of the resetting type which when energized sets a motorized timer in motion and when the preset time runs out, it acts to complete a circuit between terminals $X_4$ and $X_6$, thereby energizing the up solenoid 69b of the elevator relay. The operation of solenoid 69b effects energization of the up solenoid 64a of the elevator valve 64, thereby positioning the valve 64 to feed fluid into the hydraulic cylinder 62 to lift the elevator back to its Up position. De-energization controls by means of elevator switch 63 will lock the hydraolic system of the elevator in any position assumed at the instant of de-energization.

While the elevator is in Down position, should a work carrier be passing over the processing carrier by means of the substitute segment of the track (FIG. 2—element 38) which automatically fills the gap left by the elevator segments, then the presence of the by-passing work carrier on the substitute segment opens a position switch 70 located in the substitute segment, and interposed in the power circuit for Up solenoid 69 of the elevator relay, thus keeping the Up circuit open until the overhead is clear for elevators to rise.

In summary, therefore, it will be seen that when the start button 46 is pressed, the hydraulic pressure unit is set into motion and fluid pressure is supplied to the various stations of the conveyor system. Closure of the start switch 59 for the transfer control mechanism will initiate operation of the transfer bar to shift work carriers on the overhead track from one wok station to the next, such operation being subject to the safety circuit and taking place only if all elevators are at their upper or lower limit. At the completion of the transfer operation, the transfer mechanism is automatically retracted and is readied for the next cycle of operation.

At each elevator station, assuming that the elevator is originally in its extreme Up position, closure of the appropriate start switch 53 causes the elevator to descend to carry work to the work station, the elevator remaining at the Down position for a pre-set interval determined by timer 68, after which it automatically is raised to its Up position. Safety circuits linked to the removable and substitute rail segments act to prevent the descent of the elevator until the work carrier occupies its proper position on the removable segment and to prevent a transfer operation until the substitute segment is properly placed in the main track to fill the gap therein.

The functioning of the various start switches to effect transfer of work carriers and to operate the elevator may be made entirely automatic under the control of a suitable programming device adapted to press the switches in a predetermined sequence. This programming device, which may consist of electromagnetically operated actuating elements, may be arranged to operate sequentially to carry out specific plating operations in a given order. It may, of course, be pre-set for any other type of automatic operation.

Safety circuits

As pointed out previously, the safety circuit prevents transfer when any elevator in the system is between limits of Up or Down. Each elevator station has safety contacts at the upper limit and at the lower limit so that the $S_0$—$S_1$ circuit is closed in any particular station only when the elevator is at the extreme Up or Down position. In the extreme Up position the trackway is aligned for smooth transfer of the carrier out of the station and another carrier into the station. In the extreme Down position adequate clearance is left for overhead transfer of the bypassing or leap-frogging carrier. The upper and lower limit contacts of a station are in parallel with each other for that station so that either Up or Down position effects a closed circuit. But each pair of contacts per station is in series with the other stations so that any elevator at any station not in its extreme Down or Up position, breaks the overall safety circuit $S_0$—$S_1$ at the Transfer Valve 58 preventing forward movement until the safety condition is fulfilled.

To prevent the Up movement of an elevator while a transfer is taking place to avoid a collision between a carrier moving between elevators and a rising elevator, a transfer safety relay 71 is provided. The solenoid of relay 71 is energized through the (1) contacts of the transfer limit switch 60, this contact being broken when transfer of carriers is taking place by the forward motion of transfer bar 31.

Safety relay 71 when de-energized breaks the $L_2S$ safety circuit to the elevator relay 69 which holds the elevator in either the Up or Down position, as the case may be, until the forward motion is completed and contacts (2) of relay 60 break the circuit to valve solenoid 58a while contacts (1) are closed so that power is restored to the safety relay 71 to reactivate the $L_2S$ line. The elevators are now free to lower or raise and they are operable without the possibility of collision.

We now have a completely safe operation in which transfer cannot come forward if all elevators have not completed their Up or Down travel and elevators can neither rise nor fall from their previous position until forward transfer is completed.

Transfer frequency and loading frequency

Transfer movements are repetitive without regard to frequency of loading the machine; and "loading intervals" or "production rate" is determined by interlocking the loading station elevator with the station having the shortest process time. Thus a new load is fed to the machine only as fast as the processing cycle can absorb same.

Transfer movements are two or more per carrier processing frequency to allow spaces for "down" elevator to "rise" and insert carriers in the overhead procession. Also, where the shortest process time is relatively long, the transferring from one station to another must be kept short and therefore, the transfer movements must be maintained at frequent intervals even though no carrier is "starting" through the machine.

While the invention has been shown in what is considered to be a preferred embodiment of my invention, it is to be understood that many changes and modifications may be made therein without departing from the essential spirit of the invention. It is intended therefore in the accompanying claims to cover all such variations as fall within the true spirit of the invention.

What is claimed is:

1. A controlled conveyor system comprising a plurality of work carriers, an overhead track for conveying said carriers to various work stations disposed below said track, said track including removable rail segments vertically disposed above said stations, separate elevators operatively coupled to each of said segments to lower same to a respective work station therebelow, substitute rail segments normally disposed above said removable segments and adapted to replace said removable segments when lowered by said elevator means, means to drive said elevators between an up position in which said removable segment is aligned with said track and a down position in which said elevator is at said work station and a substitute segment is aligned with said track whereby a work carrier thereon may leap-frog a lower carrier at said work station, transfer means to shift said work carriers on said track into and out of said rail segments aligned therewith, means to drive said transfer means, and means responsive to the position of said elevators to prevent operation of said transfer means when any one of said elevators is at a position other than said up and down positions.

2. A controlled conveyor system comprising a plurality of work carriers, an overhead track for conveying said carriers to various work stations disposed below said track, said track including removable rail segments vertically disposed above said stations, separate elevators operatively coupled to each of said segments to lower same to a respective work station therebelow, substitute rail segments normally disposed above said removable segments and adapted to replace said removable segments when lowered by said elevator means, means to drive said elevators between an up position in which said removable segment is aligned with said track and a down position in which said elevator is at said work station and a substitute segment is aligned with said track whereby a work carrier thereon may leap-frog a lowered carrier at said work station, timing means initiated when said elevator arrives at said down position to activate said drive means after a pre-set interval to return said elevator to the up position, and transfer means to shift said work carriers on said track into and out of said rail segments aligned with said track, means to drive said transfer means, and means responsive to the position of said elevators to prevent operation of said transfer means when any one of said elevators is at a position other than said up and down positions.

3. In combination with a conveyor structure provided with a plurality of work carriers, an overhead track for conveying said carriers to various work stations disposed below said track at spaced positions, said track including removable transfer rail segments vertically aligned with said stations, pusher means to impart stepwise movement to said carriers to transfer same from station to station, a separate elevator for supporting each transfer segment and adapted to lower same with a carrier thereon to a respective station for processing thereat, a substitute section normally disposed above said transfer section, and means automatically inserting said substitute section in said track when said transfer section is removed therefrom to maintain the operative continuity of said track; an electric hydraulic system for said conveyor structure comprising a transfer mechanism coupled to said push means to activate same, drive means for each of said elevators to shift same between upper and lower limits, and means responsive to the position of said elevators to prevent operation of said transfer mechanism when any of said elevators occupies a position other than at said limits.

4. A controlled automatic conveyor system comprising an overhead track, work carriers suspended from said track, said track including at least one removable segment, an elevator for supporting said removable segment in said track and adapted to withdraw said segment from said track thereby causing a gap to form therein, a substitute segment, means automatically inserting said substitute segment in said track to replace the withdrawn removable segment, a transfer mechanism to impart stepwise movement to said carriers to transfer same from station to station, and switch means operatively coupled to said substitute segment and responsive to the position thereof to prevent operation of said transfer mechanism in the event said removable segment is withdrawn from said track and said substitute segment is not yet fully aligned with said track.

5. An hydraulically controlled automatic conveyor system comprising an overhead main track, a plurality of work carriers suspended from said track and movable thereon in a given direction, said track including a plurality of removable transfer rail segments positioned in vertical alignment with a like plurality of work stations, an hydraulically operated transfer mechanism to push each trolley in a stepwise manner along said track from one segment to a next segment, a separate elevator for supporting each removable segment and a carrier thereon and adapted selectively to lower same to a respective station and to return same to track registration, said elevator moving between up and down limits, a substitute rail segment disposed above said transfer segment, means automatically introducing said substitute segment into said track when said transfer segment is removed therefrom to re-establish the operative continuity of said track, an hydraulically operated cylinder for moving said elevator between said limits, and a safety circuit including up and down switches operatively coupled to each elevator and tripped when the limits thereof are reached to render said transfer mechanism operative whereby said transfer mechanism is inoperative when any elevator in said system is between limits.

6. A system, as set forth in claim 5, further including a timing device in each elevator station rendered operative when the elevator reaches its down position and operatively coupled to said hydraulic cylinder to cause raising of said elevator at the termination of a given time interval.

7. A system, as set forth in claim 5, further including a safety switch operatively coupled to said removable rail segment and adapted to render said transfer mechanism inoperative unless the work carrier occupies a pre-determined position on said removable segment.

8. A system, as set forth in claim 5, further including safety means to prevent operation of said elevators during the forward movement of said transfer mechanism.

References Cited in the file of this patent

UNITED STATES PATENTS

| 2,732,962 | Bullard | Jan. 31, 1956 |
| 2,789,569 | Davis | Apr. 23, 1957 |
| 2,833,431 | Bole | May 6, 1958 |
| 2,854,159 | Abbey | Sept. 30, 1958 |